United States Patent Office 3,344,898
Patented Oct. 3, 1967

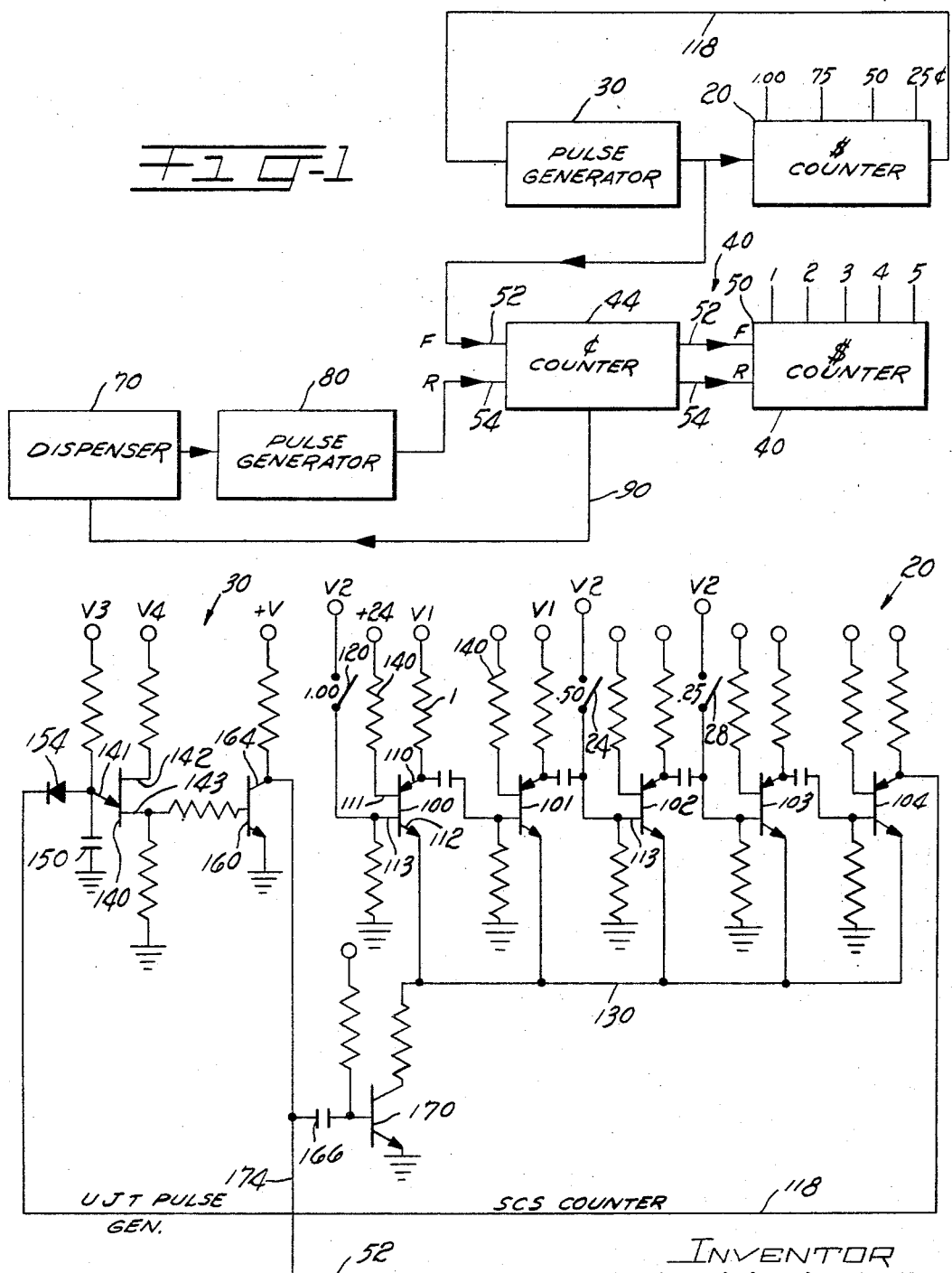

3,344,898
COIN-OPERATED DISPENSING SYSTEM
James J. Klinikowski, Somerville, N.J., assignor to Burroughs Corporation, Detroit, Mich., a corporation of Michigan
Filed Jan. 3, 1966, Ser. No. 518,232
8 Claims. (Cl. 194—9)

ABSTRACT OF THE DISCLOSURE

The disclosure is of a pulse generating circuit coupled to a multi-position counter circuit which has its last position coupled to and disabling the pulse generator when no money is on deposit in the counter. A coin receiver is coupled to the counter and, when a coin is deposited, a particular position in the counter is energized and the pulse generator is turned on. The pulse generator is free running and feeds pulses both into the counter which is emptied and into a register which is filled. The number of pulses required to empty the counter and then turn off the pulse generator is determined by the value of the deposited coin. Coins are deposited and the cycle is repeated for each coin until the register is full or until no other coins are to be deposited.

Next the product dispenser is operated and it generates a pulse for each unit quantity of product dispensed. Each such pulse empties the register by a unit amount and finally when the register is empty and the proper amount of product has been dispensed, the system is turned off.

---

This invention relates to coin-operated electronic dispensing systems.

Briefly, the system of the invention includes a pulse-generating circuit for generating pulses corresponding to unit quantities of a commodity purchased by a total quantity of money deposited in the system. A reversible counter-register circuit is coupled to the pulse-generating circuit, and the pulses representing the total quantity of money are entered in the register. The system includes means for dispensing unit quantities of the commodity and for generating pulses representing these unit quantities as they are dispensed. These dispensing pulses are fed to the counter-register, and the register is gradually emptied as the units of the commodity are dispensed. When the counter-register is completely emptied, and the purchased units have been received, the dispensing apparatus and system are automatically turned off.

The invention is described in greater detail by reference to the drawing wherein:

FIG. 1 is a block diagram of the system of the invention; and

FIG. 2 is a schematic circuit representation of a portion of the system of FIG. 1.

The system of the invention 10 includes a coin-receiving module 20, for registering units of money deposited, which is operatively connected to a pulse generator 30 for generating a number of pulses determined by the units of money deposited in receiver 20. The pulse generator 30 is also coupled to a reversible counter 40 which includes one section 44 for registering fractions of a dollar and another section 50 for registering dollars. The counter 40 includes a forward input line 52 by which input pulses are applied to the counter for counting in the forward direction. The counter also includes a reverse input line 54 by which input pulses are applied for counting in the reverse direction. The pulse generator 30 is coupled to the forward counting line 52 of the counter 40.

The system 10 also includes a dispenser 70 for dispensing the purchased product which may be fluid such as gasoline. The disepnser 70 is connected to a suitable pulse generator 80 which generates pulses corresponding to unit quantities of product given out by the dispenser. The pulse generator 80 is coupled to reverse counting input line 54 of the counter 40, and the last stage of the counter (in the reverse direction), representing zero money entered or, correspondingly, total purchased product dispensed, is coupled to the dispenser by line 90 for the purpose of disabling the dispenser.

The system to be described is adapted to receive and register 25¢ pieces to any desired total, and it is also adapted to dispense unit quantities of a product worth 25¢ each. The coin-receiving module 20 and pulse generator are shown in greater detail in FIG. 2. The coin-receiving module 20 is adapted to register up to one dollar in coins and includes five silicon-controlled switches 100, 101, 102, 103, 104 (SCS devices) which are four-electrode semiconductor devices. The electrodes of the SCS devices include anode 110, anode gate 111, cathode 112, and cathode gate 113. The provision of bias voltages and other connections which are well known for SCS devices will not be described in detail herein. The anodes 110 of all of the SCS devices are connected to a suitable D.C. power sourve V1, and the anode of each of the first four devices 101, 102, 103, 104 is capacitively coupled to the cathode gate 113 of the next adjacent SCS device in the series. The anode 110 of the last device 104 is connected back by lead 118 to the pulse generator 30, in a manner to be described.

In addition, the cathode gate 113 of the first SCS device 100 is connected to a dollar register or receiver represented by switch 120 which, when closed, connects the cathode gate to a positive D.C. power supply V2. The cathode gate of the third SCS device 102 is similarly coupled to a switch 124 representing a 50¢ register, and the cathode of the fourth SCS device 103 is coupled to a switch 128 representing a 25¢ register. The cathode electrodes are connected to a bus 130.

The pulse generator 30 includes a unijunction transistor, or double-base diode 140, which includes an emitter electrode 141, a first base 142, and a second base 143. The emitter electrode 141 is coupled to a positive D.C. bias source V3, through a capacitor 150 to ground, and through a diode 154, oriented as shown, to the anode of the fifth SCS device 104 in the register 20. Base 142 of the unijunction transistor is coupled to a positive D.C. bias source V4, and base 143 is coupled through an inverter transistor 160 whose output or collector 164 is coupled through a capacitor 166 to the base or input electrode of a switching transistor 170. The switching transistor 170 is coupled to bus 130 and thus is adapted to apply pulses to the cathode electrodes of the SCS devices. The collector of inverter transistor 160 is also connected by lead 174, either directly or through a suitable pulse generator (not shown), to the forward count line 52 of portion 44 of counter 40.

In operation of the circuit elements shown in FIG. 2, initially, the fifth device 104 is on, and its anode is at a very low positive potential which is coupled to the emitter of the unijunction transistor 140. This prevents the capacitor 150 from charging, and thus, it keeps the unijunction transistor 140 turned off. This is one stable state of the counter 20 and generator 30. When a quantity of money, say $1, is deposited in the register of the counter, the switch 120 closes, a positive potential is applied to the cathode gate 113 of the first SCS device 100 and it turns on. This causes the bus 130 to rise in potential, and the fifth device 104 is turned off whereby the unijunction transistor is unblocked, and it begins to generate pulses. Each pulse generated by unijunction transistor 140 is fed through transistors 164 and 170, and negative pulses are applied to bus 130. Each pulse drives bus 130 sufficiently above ground potential to turn off the device which was on. As each SCS device is turned off, a positive pulse is coupled to the cathode gate of the next adjacent SCS device which was off is and is now turned on. In this way, each pulse generated by the free-running unijunction transistor causes one SCS device to turn off and the next device to turn on. It can be seen that, with four pulses generated, the fifth device is again turned on and the unijunction transistor 140 is turned off. Thus, the dollar entered is represented by four pulses (25¢ each) which are entered through forward line 52 in the cents counter. Other quantities of money such as 25¢ and 50¢ pieces are similarly deposited and registered one coin at a time.

The portions 44 and 50 of counter 40 may also be SCS counters such as the BIP 8054 reversible counters sold by Burroughs Corporation, or they may be any other suitable types of counters.

Assuming that dispenser 70 is a conventional gasoline pump, then it may be operated manually or it may be arranged to start automatically when the counter 40 has been filled by the deposit of a predetermined amount of money. The last stage of the counter thus may be adapted to transmit a signal on lead 90 to start the dispenser 70. Pulse generator 80 is adapted to generate a pulse for each 25¢ quantity of gasoline dispensed. Pulse generator 80 may be any suitable mechanism, and, in one arrangement, it may comprise a relay-controlled circuit coupled to the mechanical pump of dispenser 70. As the gasoline is dispensed and the pulse generator generates pulses, each pulse is fed into the counter 40 on reverse count line 54 so that the counter empties or moves toward zero stored count with each input pulse. When the count in the counter reaches the last stage, which represents zero count and means that gasoline has been dispensed in an amount corresponding to the amount of money deposited, then the dispenser 70 is turned off by hand or it is turned off automatically by a signal from the last stage of the counter.

It will be clear to those skilled in the art that modifications may be made in the specific features described to illustrate the principles of the invention. For example, counters and pulse generators, other than those specifically described, may be employed, and where appropriate, tubes or other semiconductor devices may be used in place of SCS devices or transistors. In addition, a money unit other than 25¢ may be employed, and the total dollar capacity of the system may have any suitable limit, and, of course, merchandise other than gasoline may be dispensed.

What is claimed is:

1. An electronic coin-operated dispensing system comprising:
   a coin receiver which comprises a multiple position circuit in which each position represents a quantity of money entered in the coin receiver, one position representing an empty coin receiver,
   a pulse generator coupled to said coin receiver,
   said one position in said coin receiver being coupled to and disabling said pulse generator before coins are deposited in said coin receiver and after total coinage has been registered by said pulse generator in an associated electronic circuit,
   said coin receiver enabling said pulse generator after coins are deposittd therein, said pulse generator generating a number of pulses determined by the coins deposited in said receiver, said coin receiver disabling said pulse generator after said number of pulses have been generated,
   a reversible counter adapted to count in forward and reverse directions,
   said pulse generator being coupled to said reversible counter to enter pulses therein in the forward direction representing the amount of money deposited in said coin receiver, and
   an auxiliary pulse source coupled to said reversible counter to enter counts therein in a reverse direction, said reversible counter being coupled to said auxiliary pulse source to disable it after said counter has been emptied of all of its stored counts.

2. The system defined in claim 1 wherein said auxiliary pulse source is coupled to means for dispensing quantities of a substance purchased by the coins deposited in said coin receiver, said auxiliary pulse source being adapted to generate a number of pulses in proportion to the quantity of substance dispensed.

3. The system defined in claim 1 wherein said coin received is a counter circuit having a plurality of bistable counting stages with one stage being coupled to said pulse generator, said one stage being adapted to be in a first operating state and disabling said pulse generator when there is no money in said receiver, said one stage being adapted to be in a second operating state and enabling said pulse generator when money is inserted in said receiver.

4. The system defined in claim 1 wherein said coin receiver is an unidirectional counter circuit having a plurality of series-connected counting stages with the last stage in the series being coupled to and controlling the operation of said pulse generator,
   said last stage being adapted to operate in one state in which it is turned on, a stage which occurs when there is no money in said coin receiver, in which state said last stage renders said pulse generator inoperative,
   said last stage being adapted to operate in a second state in which it is turned off, said second state occurring when money is present in said coin receiver, in which state said last stage renders said pulse generator operative and free-running,
   all of the other stages being inoperative and not counting when said last stage is on, at least one of the other stages being operative and registering a count when said last stage is off,
   all of said stages being coupled in series so that when money is deposited in the coin receiver and one stage is rendered operative and registers a count, the last stage is turned off and the pulse generator generates pulses,
   each pulse causing the counting operation to proceed from said one stage which is rendered operative by the deposit of money in said coin receiver through the adjacent stages until finally the last stage is turned on and the pulse generator is disabled.

5. The system defined in claim 1 wherein said coin receiver is an unidirectional counter circuit having a plurality of bistable counting stages with the last stage being coupled to and controlling the operation of said pulse generator,
   said last stage being adapted to operate in one stage in which it is turned on, a state which occurs when there is no money in said coin receiver, in which state said last stage renders said pulse generator inoperative,
   said last stage, in a second state of operation being turned off, said second state occurring when money is present in said coin receiver, in which state said last stage renders said pulse generator operative and free-running,
   all of the other stages being inoperative and not counting when said last stage is on, all of the other stages being operative and registering counts in order when said last stage is off, all of said stages being connected in series with selected ones of said stages being connected to coin-receiving means so that when a coin is deposited, a corresponding one of said selected stages is rendered operative whereby the last stage is rendered inoperative and the pulse generator is turned on and generates pulses, each pulse causing the counting operation to proceed from the one stage which is rendered operative by the deposit of money in said coin receiver through the adjacent stages until finally the last stage is turned on and the pulse generator is disabled.

6. The system defined in claim 5 wherein each of said counting stages includes an electron discharge device.

7. The system defined in claim 5 wherein each of said counting stages includes a semiconductor device.

8. A coin-operated product dispensing system including:

a combination pulse generator and coin receiver-counter circuit coupled together so that when coins are inserted into the coin receiver, the pulse generator generates a corresponding number of pulses into the counter circuit, said counter circuit comprising an unidirectional counter circuit having a plurality of bistable counting stages with the last stage being coupled to and controlling the operation of said pulse generator, said last stage being adapted to operate in one state in which it is turned on, a state which occurs when there is no money in said coin receiver, in which state said last stage renders said pulse generator inoperative, said last stage, in a second state of operation being turned off, said second state occurring when money is present in said coin receiver, in which state said last stage renders said pulse generator operative and free-running, all of the other stages being inoperative and not counting when said last stage is on, all of the other stages being operative and registering counts in order when said last stage is off, all of said stages being connected in series with selected ones of said stages being connected to coin-receiving means so that when a coin is deposited, a corresponding one of said selected stages is rendered operative whereby the last stage is rendered inoperative and the pulse generator is turned on and generates pulses, each pulse causing the counting operation to proceed from the one stage which is rendered operative by the deposit of money in said coin receiver through the adjacent stages until finally the last stage is turned on and the pulse generator is disabled, a reversible counter having forward count input and reverse count input lines, said pulse generator also being coupled to the forward count line of said reversible counter, apparatus for dispensing a purchased product, a second pulse generator associated with said dispensing apparatus and adapted to generate pulses corresponding to unit quantities of dispensed product, said second pulse generator being coupled to the reverse count line of said reversible counter, said reversible counter also being coupled to said dispensing apparatus so that when it registers zero count representing the dispensing of the total purchased product, the dispenser is turned off.

References Cited
UNITED STATES PATENTS
3,067,936  12/1962  Kasper et al. _____ 194—9 X SAMUEL F. COLEMAN, *Primary Examiner.*